(12) United States Patent
Kabasawa

(10) Patent No.: US 8,062,808 B2
(45) Date of Patent: Nov. 22, 2011

(54) FUEL CELL DEVICE AND AN ELECTRONIC EQUIPMENT USING FUEL CELL DEVICE

(75) Inventor: Yasunari Kabasawa, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 717 days.

(21) Appl. No.: 12/145,742

(22) Filed: Jun. 25, 2008

(65) Prior Publication Data

US 2009/0004534 A1  Jan. 1, 2009

(30) Foreign Application Priority Data

Jun. 28, 2007 (JP) ................................ 2007-170534

(51) Int. Cl.
*H01M 8/04* (2006.01)

(52) U.S. Cl. ........ 429/515; 429/507; 429/505; 429/506; 429/454; 429/513

(58) Field of Classification Search ................. 429/515, 429/506, 443, 447, 454, 455, 513, 507, 505; 220/827–830
See application file for complete search history.

(56) References Cited

U.S. PATENT DOCUMENTS

| | | |
|---|---|---|
| 2005/0106441 A1 | 5/2005 | Yamamoto et al. |
| 2005/0233190 A1 | 10/2005 | Finkelshtain et al. |
| 2006/0263672 A1 | 11/2006 | Lee et al. |
| 2007/0166595 A1 | 7/2007 | Akiyama et al. |

FOREIGN PATENT DOCUMENTS

| | | |
|---|---|---|
| JP | 09-213359 A | 8/1997 |
| JP | 2003-287220 A | 10/2003 |
| JP | 2003-317756 A | 11/2003 |
| JP | 2004-213959 A | 7/2004 |
| JP | 2004-265835 A | 9/2004 |
| JP | 2005-071713 A | 3/2005 |
| WO | WO 2005/057703 A1 | 6/2005 |
| WO | WO 2006088450 A1 * | 8/2006 |

OTHER PUBLICATIONS

International Search Report and Written Opinion dated Sep. 18, 2008, issued in a counterpart International Application. 12 pages.
Japanese Office Action dated Dec. 7, 2010 (and English translation thereof) in counterpart Japanese Application No. 2007-170534.

* cited by examiner

*Primary Examiner* — Jennifer K. Michener
*Assistant Examiner* — Heng Chan
(74) *Attorney, Agent, or Firm* — Holtz, Holtz, Goodman & Chick, PC

(57) ABSTRACT

Disclosed is a fuel cell device comprising: a fuel cartridge to accumulate a fuel therein; and a fuel cell device main body to generate electric power by using the fuel accumulated in the fuel cartridge, wherein the fuel cell device main body is provided with a cartridge conveying body, the fuel cartridge being attached to and detached from the cartridge conveying body, and the cartridge conveying body is provided so as to be rotatable with respect to the fuel cell device main body.

11 Claims, 13 Drawing Sheets

FUEL CELL DEVICE AND AN ELECTRONIC EQUIPMENT USING FUEL CELL DEVICE

BACKGROUND OF THE INVENTION

1. Field of the Invention

The present invention relates to a fuel cell device and an electronic equipment.

2. Description of Related Art

A fuel cell extracts electric power by an electrochemical reaction of a fuel, and the research and development of the fuel cell have widely been performed. As a fuel to be used for an electrochemical reaction of the fuel cell, a hydrogen gas which is generated by reforming a raw fuel such as methanol with a reformer can be cited. Moreover, a fuel cell using the methanol as it is also exists.

It is considered that these fuels are normally accumulated in a detachably attachable container to a fuel cell device. Moreover, an electronic equipment capable of attaching and detaching the whole fuel cell device including a fuel container has also been considered. See, for example, Japanese Patent Application Laid-Open Publications Nos. 9-213359, 2004-213959, and 2004-265835.

Now, in order to realize a detachably attachable fuel cartridge to a fuel cell device in an electronic equipment such as a notebook-sized personal computer, it is required that an operator using the electronic equipment can freely attach and detach the fuel cartridge by a simple operation without reversing the equipment.

It is an object of the present invention to provide a fuel cell device capable of freely attaching and detaching a fuel cartridge by a simple operation and an electronic equipment equipped with the fuel cell device.

SUMMARY OF THE INVENTION

According to a preferred embodiment of the present invention, there is provided a fuel cell device comprising:

a fuel cartridge to accumulate a fuel therein; and a fuel cell device main body to generate electric power by using the fuel accumulated in the fuel cartridge, wherein the fuel cell device main body is provided with a cartridge conveying body, the fuel cartridge being attached to and detached from the cartridge conveying body, and the cartridge conveying body is provided so as to be rotatable with respect to the fuel cell device main body.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

In the following, the preferred embodiment of the present invention will be described with reference to the attached drawings. Incidentally, although various technically preferable limitations for implementing the present invention are given to the embodiment described in the following, the scope of the invention is not limited to the following embodiment and shown examples.

Figure 1:
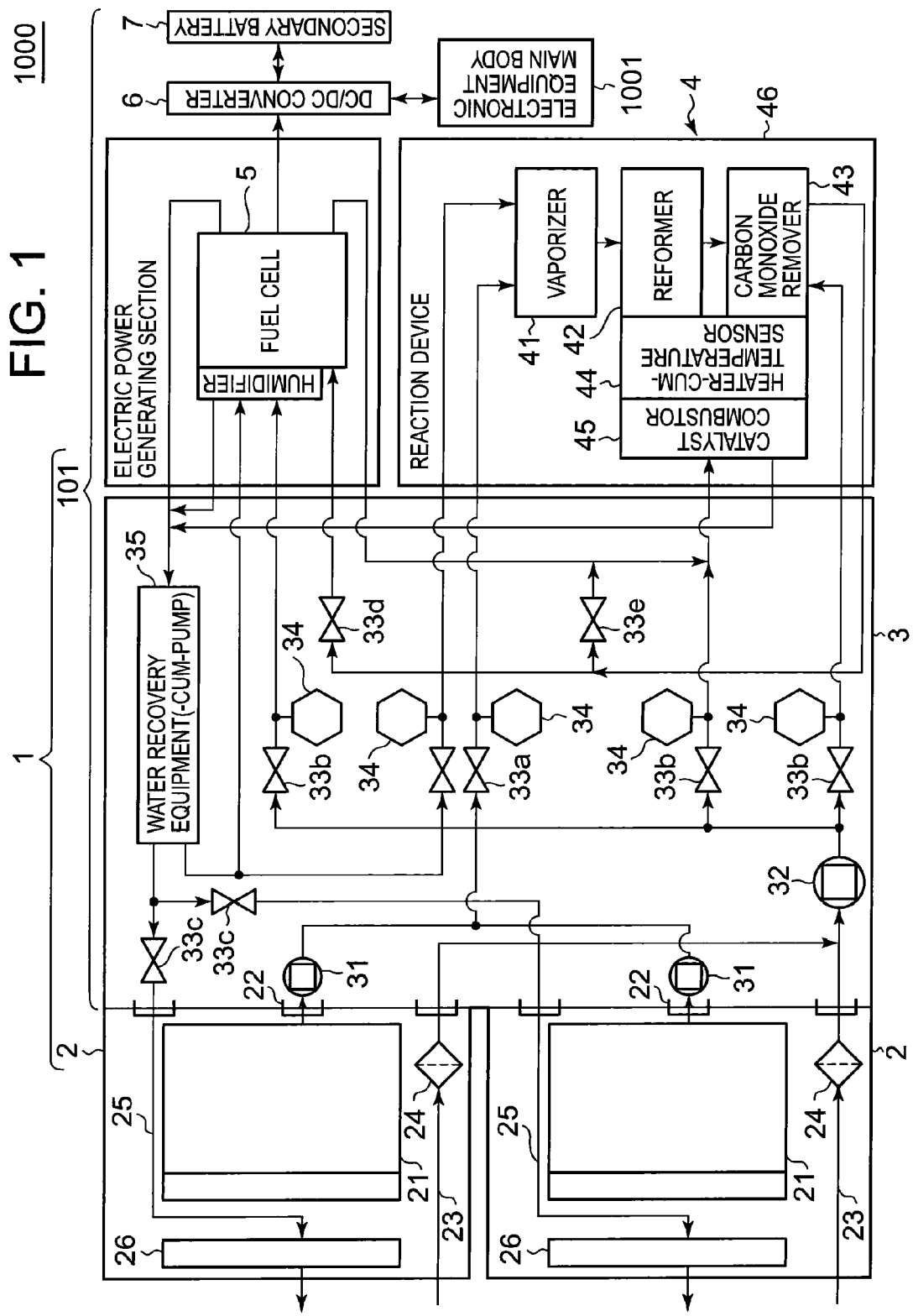
FIG. 1 is a block diagram showing an electronic equipment 1000 according to an embodiment of the present invention.
Figure 2:
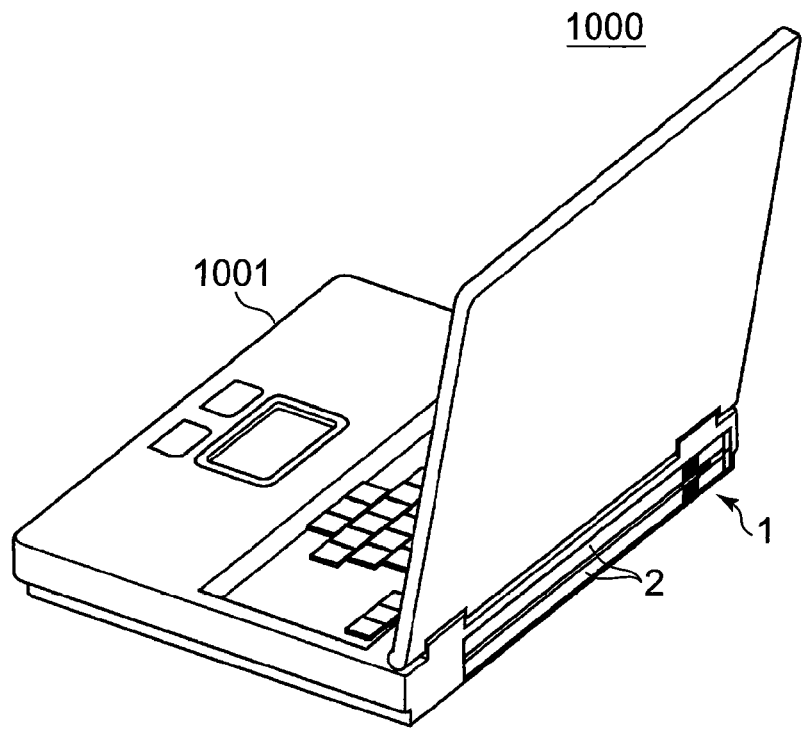
FIG. 2 is a perspective view showing the back surface, the top surface, and the right side surface of the electronic equipment 1000.

FIG. 1 is a block diagram showing an electronic equipment 1000 according to a first embodiment of the present invention, and FIG. 2 is a perspective view showing the back surface, the top surface, and the right side surface of the electronic equipment 1000. The electronic equipment 1000 is a notebook-sized personal computer.

The electronic equipment 1000 is equipped with a fuel cell device 1 and the electronic equipment main body 1001 driven by the electric energy supplied from the fuel cell device 1. The fuel cell device 1 generates the electric energy to output the generated electric energy to the electronic equipment main body 1001 as described below.

Next, the fuel cell device 1 is described in detail. The fuel cell device 1 generates the electric energy to be output to a DC/DC converter 6, and the fuel cell device 1 comprises fuel cartridges 2, a flow path substrate 3, a reaction device 4, a fuel cell 5, the DC/DC converter 6, a secondary battery 7, and the like.

Each of the fuel cartridges 2 is equipped with a fuel container 21, an intake air flow path 23, and an exhaust air flow path 25.

The fuel container 21 accumulates a liquid raw fuel (for example, methanol, ethanol, or dimethyl ether) or a mixed liquid of the raw fuel and water. Incidentally, the liquid raw fuel and the water may be accumulated in respective containers. The fuel container 21 is provided with a supply section 22 to eject the mixed liquid, and the supply section 22 is connected to a liquid intake section 31*a* of a pump 31 on the flow path substrate 3. The supply section 22 is, for example, a duckbill valve formed in a duckbill using a material having flexibility and elasticity (for example, elastomer), and is fitted to the fuel cartridge 2 with the tip of the duckbill facing the inside of the fuel cartridge 2. Because the supply section 22 is a check valve, the leakage of the mixed liquid from a fuel ejecting port to the outside of the fuel cartridge 2 can be prevented. By the insertion of the liquid intake section 31*a* into the supply section 22, the mixed liquid is supplied from the fuel container 21 in the fuel cartridge 2 to the pump 31.

An air filter 24 to remove the dust in the air is provided in the intake air flow path 23. The intake air flow path 23 is connected to an air pump 32 on the flow path substrate 3.

A gas-liquid separating film 26 to remove liquid water included in an exhaust gas is provided in the exhaust air flow path 25. The exhaust air flow path 25 is connected to water recovery equipment 35 through an ejection valve 33*c* on the flow path substrate 3.

Figure 3:
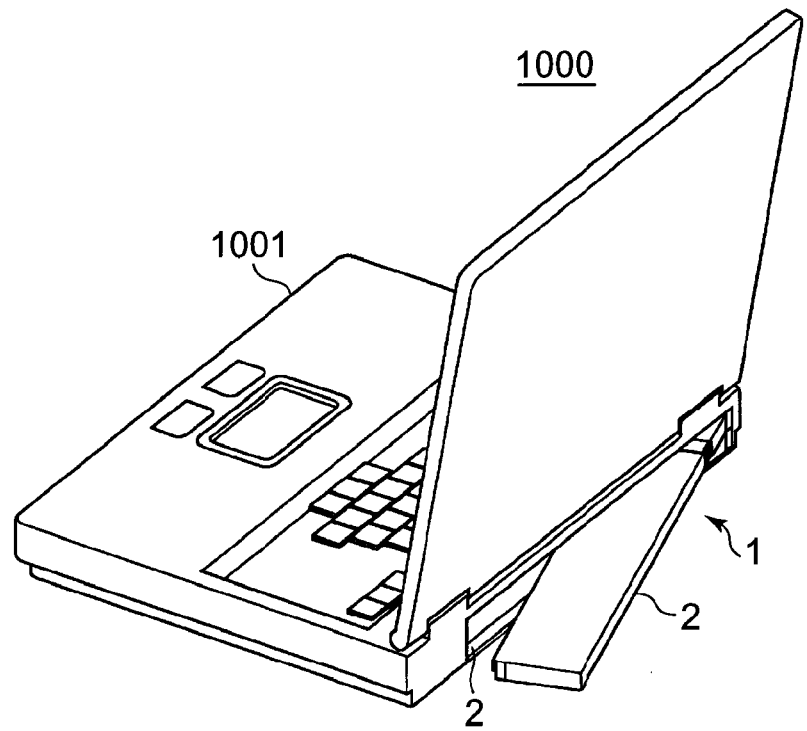
FIG. 3 is another perspective view showing the back surface, the top surface, and the right side surface of the electronic equipment 1000.

In the electronic equipment 1000, as shown in FIG. 2, the fuel cartridges 2 are provided on the back surface side of the electronic equipment 1000, and the fuel cartridges 2 can be removed by being rotated as shown in FIG. 3.

On the flow path substrate 3, the pumps 31, the air pump 32, various valves 33, flow meters 34, the water recovery equipment 35, and the like, are provided.

The pumps 31 are connected to the supply sections 22, respectively. The pumps 31 suck the raw fuel or the mixed liquid accumulated in the fuel containers 21, and sends the sucked raw fuel or the mixed liquid to a vaporizer 41 in the reaction device 4 through the fuel supplying valve 33*a*.

The air pump 32 sucks the air that has transmitted the air filters 24, and supplies the sucked air to a carbon monoxide remover 43, a catalyst combustor 45, and the oxygen electrode of the fuel cell 5, all described later, through the air supplying valves 33*b*.

The water recovery equipment 35 condenses the water in an exhaust gas ejected from the catalyst combustor 45 and the oxygen electrode of the fuel cell 5 to recover the condensed water. Then, the water recovery equipment 35 ejects the remaining gas to the outside through the ejection valves 33*c*, the exhaust air flow paths 25, and the gas-liquid separating films 26. Moreover, the water recovery equipment 35 also recovers the water used for humidifying the air in a humidifier 51.

Incidentally, the water recovery equipment 35 also functions as a pump, and supplies the recovered water to the vaporizer 41 and the humidifier 51.

The reaction device 4 is equipped with the vaporizer 41, a reformer 42, the carbon monoxide remover 43, a heater-cum-temperature sensor 44, the catalyst combustor 45, and a heat insulating container 46.

The vaporizer 41 heats the raw fuels sent from the fuel cartridges 2 and the water sent from the water recovery equipment 35 to a temperature within a range from about 110° C. to about 160° C. by the heat transferred from the reformer 42, the heater-cum-temperature sensor 44, and the like, to vaporize the raw fuels and the water. The gas mixture vaporized in the vaporizer 41 is sent to the reformer 42.

A flow path is formed in the reformer 42 and a catalyst is carried on the wall surface of the flow path. The reformer 42 heats the gas mixture sent from the vaporizer 41 to a temperature within a range from about 300° C. to about 400° C. by the heat transferred from the catalyst combustor 45 and the heater-cum-temperature sensor 44 to cause a reforming reaction by the catalyst in the flow path. That is, a gas mixture (reformed gas) including hydrogen, carbon dioxide, each as a fuel, and infinitesimal carbon monoxide, as a by-product, and the like, is produced by a catalytic reaction of the raw fuel and water.

When the raw fuel is methanol, a steam reforming reaction, which is the primary reaction and is expressed by the following formula (1), is mainly caused in the reformer 42.

$$CH_3OH + H_2O \rightarrow 3H_2 + CO_2 \tag{1}$$

Incidentally, infinitesimal carbon monoxide as a by-product is produced (about 1%) by a side reaction expressed by the following formula (2) which is caused successively after the chemical reaction formula (1).

$$H_2 + CO_2 \rightarrow H_2O + CO \tag{2}$$

The products (reformed gas) by the reactions of the formulae (1) and (2) are sent out to the carbon monoxide remover 43.

A flow path is formed in the inside of carbon monoxide remover 43, and a catalyst is carried on the wall surface of the flow path. The reformed gas produced in the reformer 42 and the air in the outside are sent to the carbon monoxide remover 43. The carbon monoxide remover 43 is kept at a temperature within a range from about 110° C. to about 160° C., and the carbon monoxide in the reformed gas is preferentially oxidized by the catalyst as the primary reaction (selective oxidation reaction) expressed by the following formula (3). Thereby carbon dioxide is produced as the main product, and the density of the carbon monoxide in the reformed gas can be lowered to about 10 ppm at which density of the carbon monoxide in the reformed gas can be supplied to the fuel cell 5.

$$2CO + O_2 \rightarrow 2CO_2 \tag{3}$$

Incidentally, the carbon monoxide remover 43 is heated by the heat from the heater-cum-temperature sensor 44 at the time of the starting, and is heated by the reaction expressed by the formula (3) and the heat conducted from the reformer 42 at the time of a steady state operation.

The reformed gas which has passed through the carbon monoxide remover 43 passes through the reformed gas supplying valve 33*d* on the flow path substrate 3 to be sent out to the fuel cell 5. Incidentally, as the need arises, the reformed gas supplying valve 33*e* is opened to supply the reformed gas to the catalyst combustor 45.

The heater-cum-temperature sensor 44 is a thin film resistor, and fulfills the role of a heater which consumes electric power to generate heat. Moreover, because the electric resistance of the heater-cum-temperature sensor 44 changes dependently on a temperature, the heater-cum-temperature sensor 44 is used for temperature measurement by measuring the resistance value thereof to fulfill the role of a temperature sensor.

A flow path is formed at the inside of the catalyst combustor 45, and a catalyst is carried on the wall surface of the flow path. A gas mixture including the unreacted reformed gas (offgas) having passed through the fuel cell 5 and the outside air is sent to the catalyst combustor 45, which will be described later, and the hydrogen remaining in the offgas is burnt by the air. The reaction heat to be used for the vaporization of the mixed liquid in the vaporizer 41 and the reforming reaction in the reformer 42 and the like is hereby supplied. Incidentally, the amount of the reaction heat to be supplied is adjusted by adjusting the amount of the air to be supplied to the catalyst combustor 45.

The heat insulating container 46 is made by forming a heat reflecting film on the internal wall surface of a housing made of a metal plate, such as a stainless (SUS 304) plate and a Kovar alloy plate, a glass substrate, or the like, and houses therein the vaporizer 41, the reformer 42, the carbon monoxide remover 43, the heater-cum-temperature sensor 44, and the catalyst combustor 45. The inside space of the heat insulating container 46 is kept to be at a lower pressure (0.1 Pa or less) in order to prevent the heat conduction and convection of gas molecules.

The fuel cell 5 is a solid polymer type fuel cell, in which solid polymer electrolyte films and separators are laminated. The solid polymer electrolyte films include a fuel electrode (anode) and an oxygen electrode (cathode) that are respectively formed on both sides thereof. The separators supply the reformed gas to the fuel electrode and supplies oxygen to the oxygen electrode.

The solid polymer electrolyte film has a character of transmitting hydrogen ions and not transmitting oxygen molecules, hydrogen molecules, and electrons. On the side of the fuel electrode of the solid polymer electrolyte film, a reaction described in the following formula (4) by the hydrogen in the reformed gas sent from the carbon monoxide remover 43 is caused.

$$H_2 \rightarrow 2H^+ + 2e^- \quad (4)$$

The produced hydrogen ions transmit the solid polymer electrolyte film to reach the oxygen electrode side. The produced electrons pass through an external circuit to reach the oxygen electrode side. The external circuit means the DC/DC converter 6 here.

On the oxygen electrode side of the solid polymer electrolyte film, water is produced by the hydrogen ions having transmitted the solid polymer electrolyte film, the oxygen in the air, and electrons having passed through the external circuit to reach the oxygen electrode, as shown in the following formula (5).

$$2H^+ + \tfrac{1}{2}O_2 + 2e^- \rightarrow H_2O \quad (5)$$

Incidentally, the air to be supplied to the oxygen electrode side through the air supplying valve 33b is sufficiently humidified by the humidifier 51 beforehand.

The DC/DC converter 6 includes not only the function of converting the electric energy output from the fuel cell 5 into a pertinent voltage, and, after that, supplying the voltage to the electronic equipment main body 1001, but also the function of charging the secondary battery 7 with the voltage. Thereby, even when the fuel cell device 1 is not operating, it is possible to supply the electric energy charged in the secondary battery 7 to the electronic equipment main body 1001.

[Concrete Structure of Fuel Cell Device]

Figure 4:
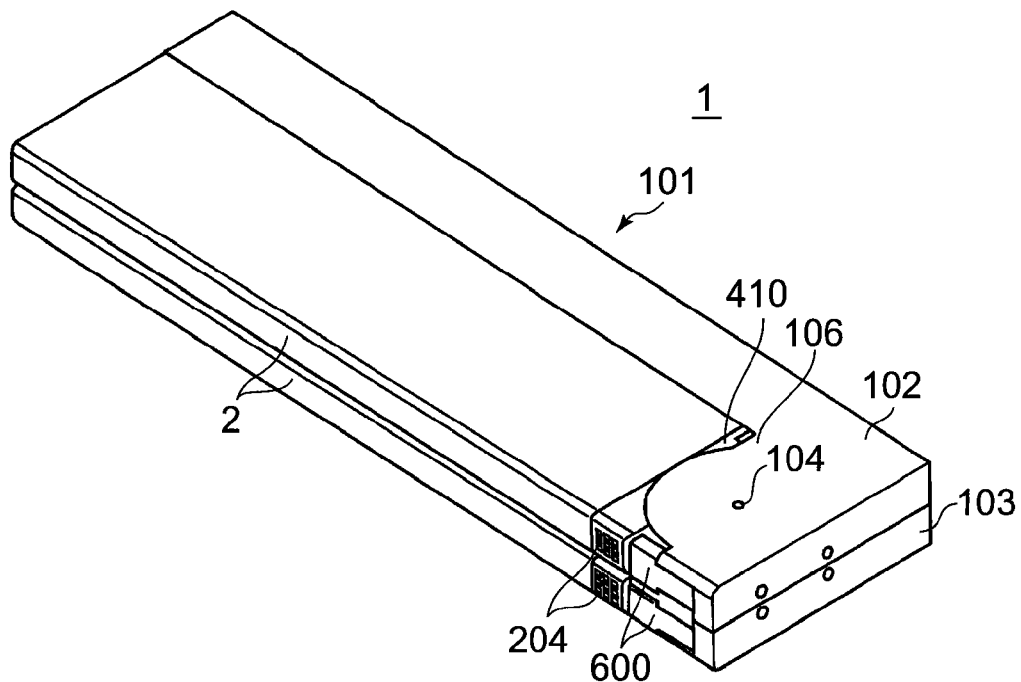
FIG. 4 is a perspective view showing the top surface, the back surface, and the left side surface of a fuel cell device 1.
Figure 5:
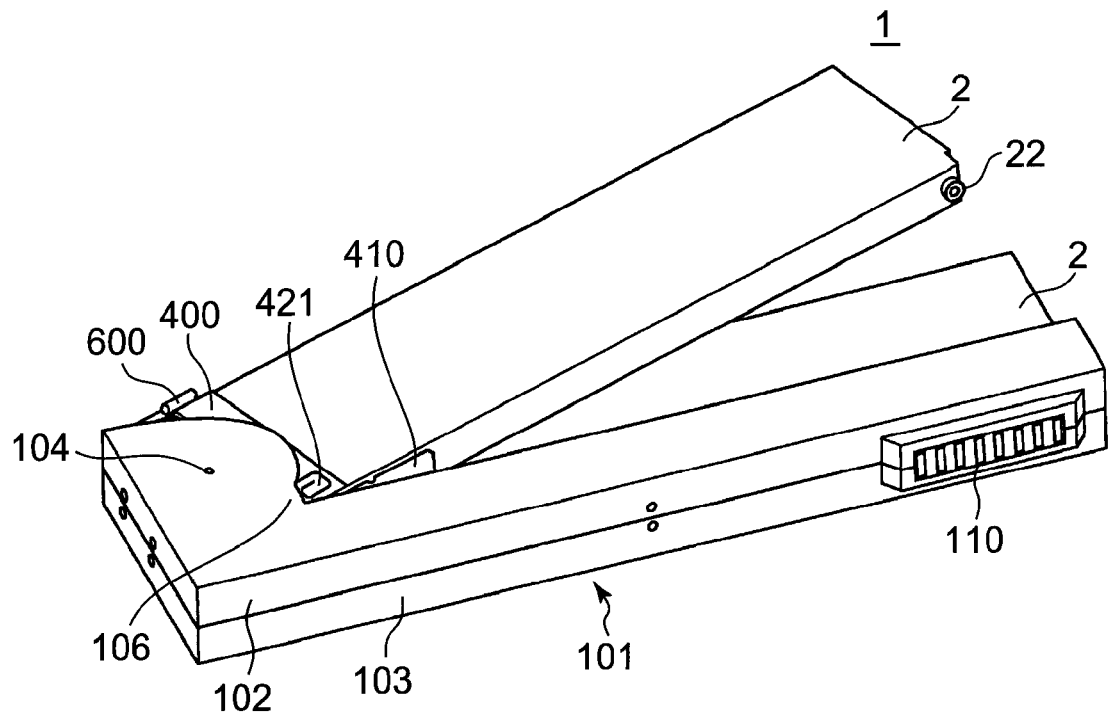
FIG. 5 is a perspective view showing the top surface, the front surface, and the left side surface of the fuel cell device 1.

Next, the concrete structure of the fuel cell device 1 is described. FIG. 4 is a perspective view showing the top surface, the back surface, and the left side surface of the fuel cell device 1, and FIG. 5 is a perspective view showing the top surface, the front surface, and the left side surface of the fuel cell device 1.

The fuel cell device 1 is rectangular parallelepiped in shape as a whole, and the size and the shape of the fuel cell device 1 are similar to those of a lithium ion secondary battery, which is generally used for a notebook-sized personal computer. Moreover, an electric power supplying terminal 110 is provided on the front surface of the fuel cell device 1. The electric power supplying terminal 110 is connected to a not-shown power connector provided in the electronic equipment main body 1001.

The fuel cell device 1 is covered by the upper housing 102 and the lower housing 103 except for the parts of the fuel cartridges 2. Through-holes 104 and 105, with which axial projections 401 of the cartridge conveying bodies 400, which will be described later, are engaged, are provided in the upper housing 102 and the lower housing 103, respectively.

Figure 6:
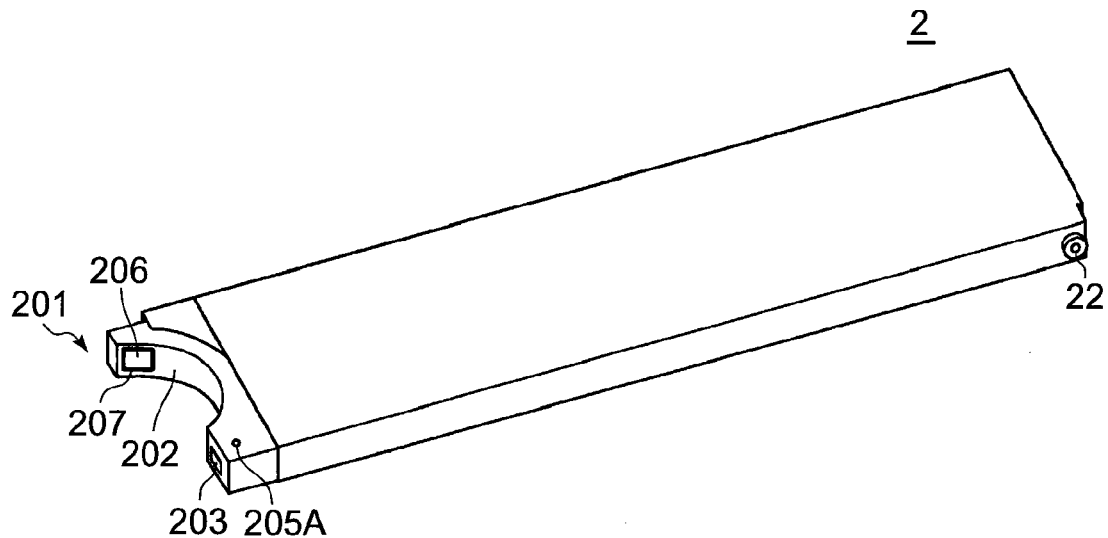
FIG. 6 is a perspective view showing the top surface, the front surface, and the left side surface of a fuel cartridge 2.

FIG. 6 is a perspective view showing the top surface, the front surface, and the left side surface of each of the fuel cartridges 2. The two fuel cartridges 2 are respectively tabular in shape, and are vertically superposed as shown in FIGS. 4 and 5.

The supply sections 22 which are to be connected to the pumps 31 are formed on the right end parts of the front surfaces of the fuel cartridges 2.

The left end parts of the fuel cartridges 2 are formed to be thinner than the other parts in the vertical direction so as to be formed as detachably attaching sections 201, with which the fuel cartridges 2 are attached and detached to the cartridge holding sections 403 of the cartridge conveying bodies 400. A circular arcuate concave portion 202 is formed in each of the detachably attaching sections 201. The concave portion 202 is disposed so as to come into contact with the outer peripheral surface of the cylindrical air pump 32, which will be described later, and slides along the outer peripheral surface of the air pump 32 in association with the rotations of the cartridge conveying body 400.

A connection hole 203 connected to an exhaust port 302 of the flow path substrate 3 is formed in front of the concave portion 202 of the detachably attaching section 201. The connection hole 203 is connected to an exhaust port 204 formed on the back surface of the fuel cartridge 2, and a portion from the connection hole 203 to the exhaust port 204 is the exhaust air flow path 25. Incidentally, the exhaust port 204 is blocked by the gas-liquid separating film 26.

Moreover, engaging concave portions 205A and 205B for engaging with seizing projections 422 of the cartridge conveying body 400, which will be described later, are formed on the top surface and under surface, respectively, of the part where the connection hole 203 of the detachably attaching section 201 is formed. Incidentally, because the engaging concave portions 205A and 205B are formed on both the surfaces, the fuel cartridge 2 can be attached to either of the upper and lower cartridge conveying bodies 400.

In the rear of the concave portion 202, a through-hole 206 to pierce the detachably attaching section 201 in the front-back direction is formed at the position corresponding to an inlet port 32a of the air pump 32, which will be described later. The through-hole 206 is the intake air flow path 23.

Incidentally, a rubber sheet 207 is provided along the outer peripheral surface of the through-hole 206 on the side of the concave portion 202. The rubber sheet 207 blocks the gap between the inlet port 32a and the intake air flow path 23.

Figure 7:
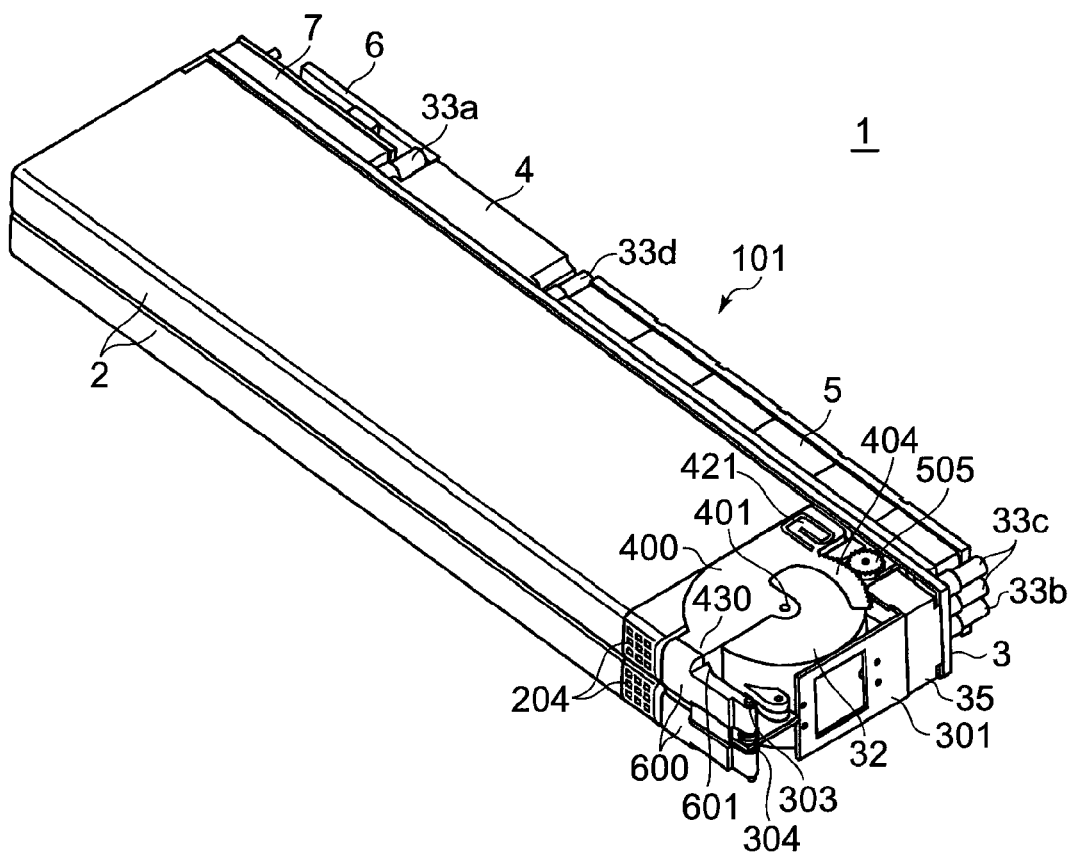
FIG. 7 is a perspective view showing the top surface, the back surface, and the left side surface of the fuel cell device 1 in a state in which an upper housing 102 and a lower housing 103 are taken away.
Figure 8:
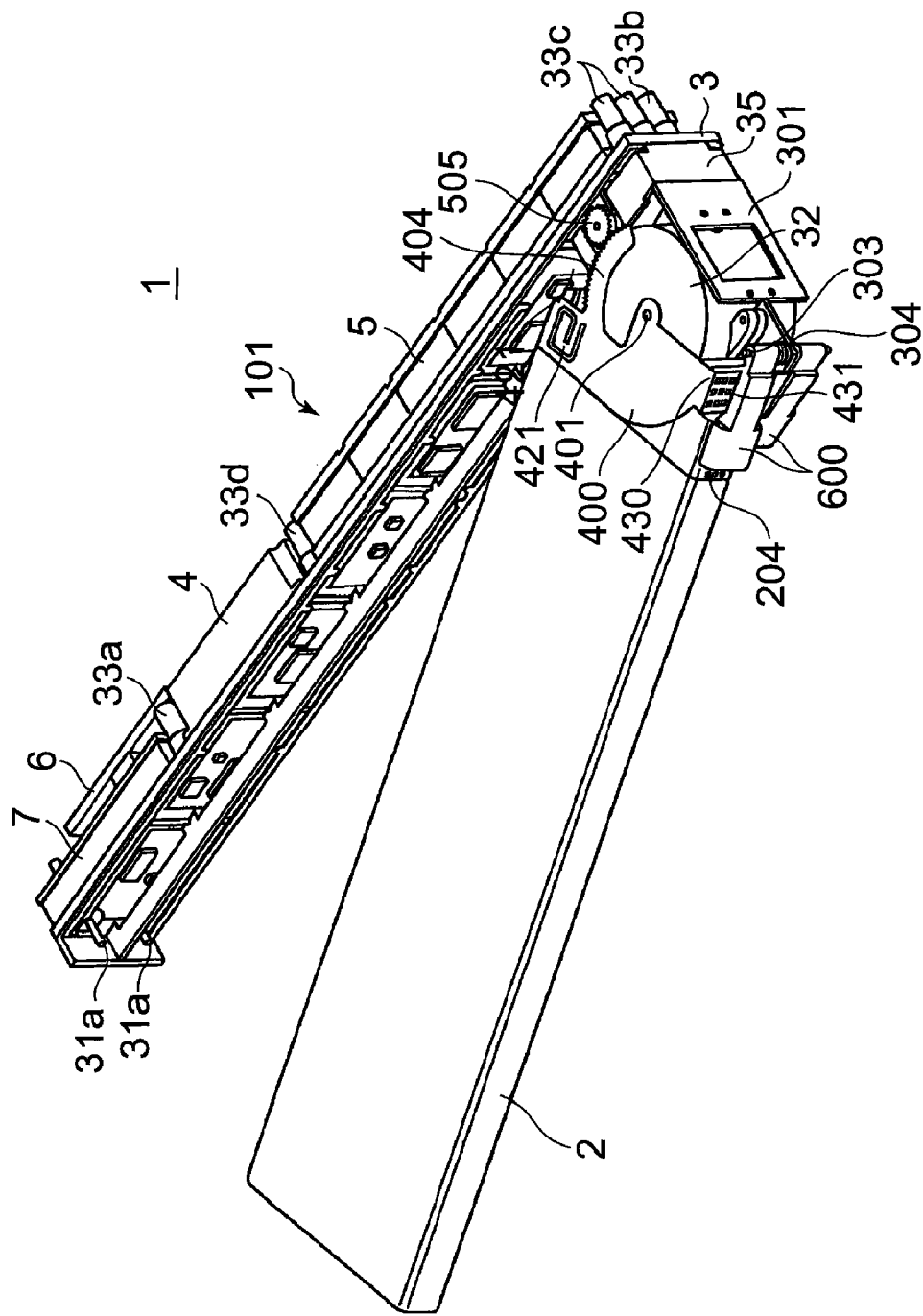
FIG. 8 is another perspective view showing the top surface, the back surface, and the left side surface of the fuel cell device 1 in the state in which the upper housing 102 and the lower housing 103 are taken away.
Figure 9:
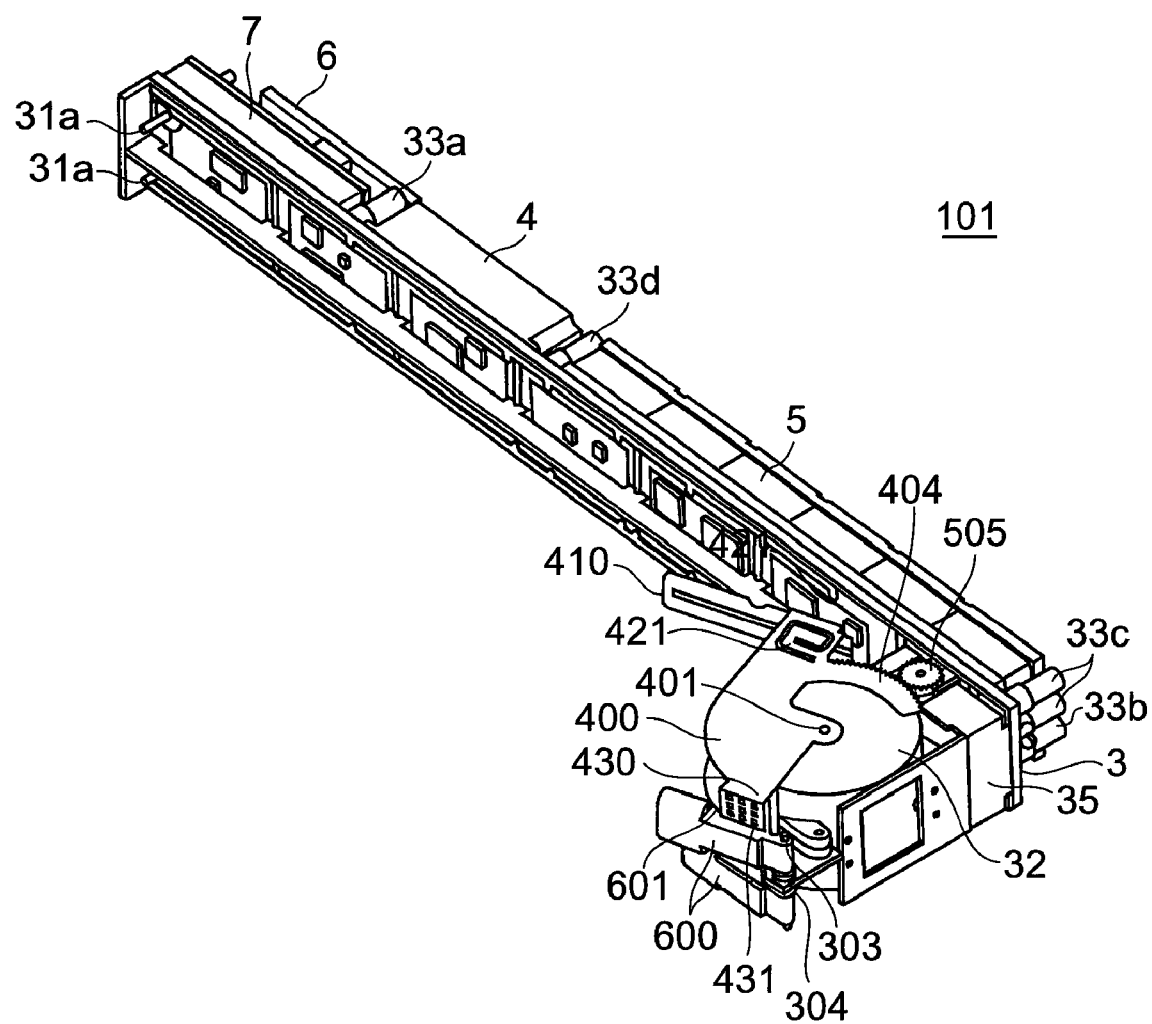
FIG. 9 is a perspective view showing the top surface, the back surface, and the left side surface of the fuel cell device main body 101 in the state in which the fuel cartridge 2 has been removed from the fuel cell device 1.
Figure 10:
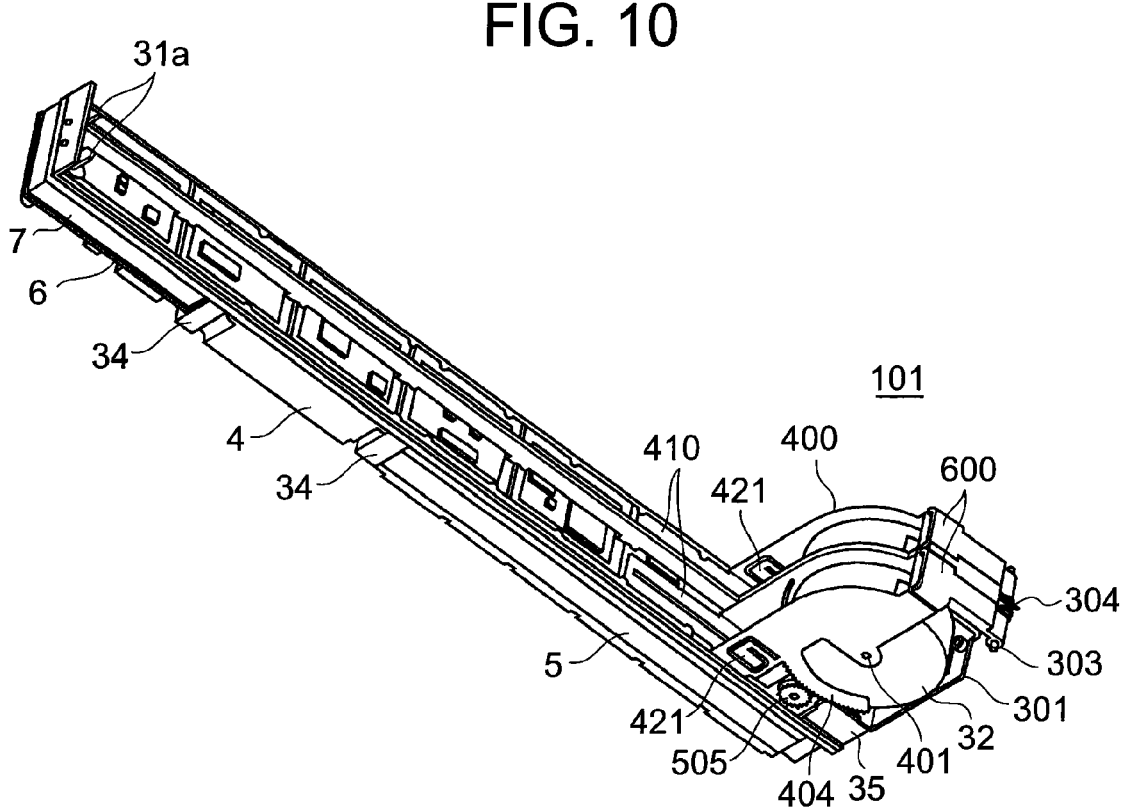
FIG. 10 is a perspective view showing the under surface, the back surface, and the right side surface of the fuel cell device main body 101.
Figure 11:
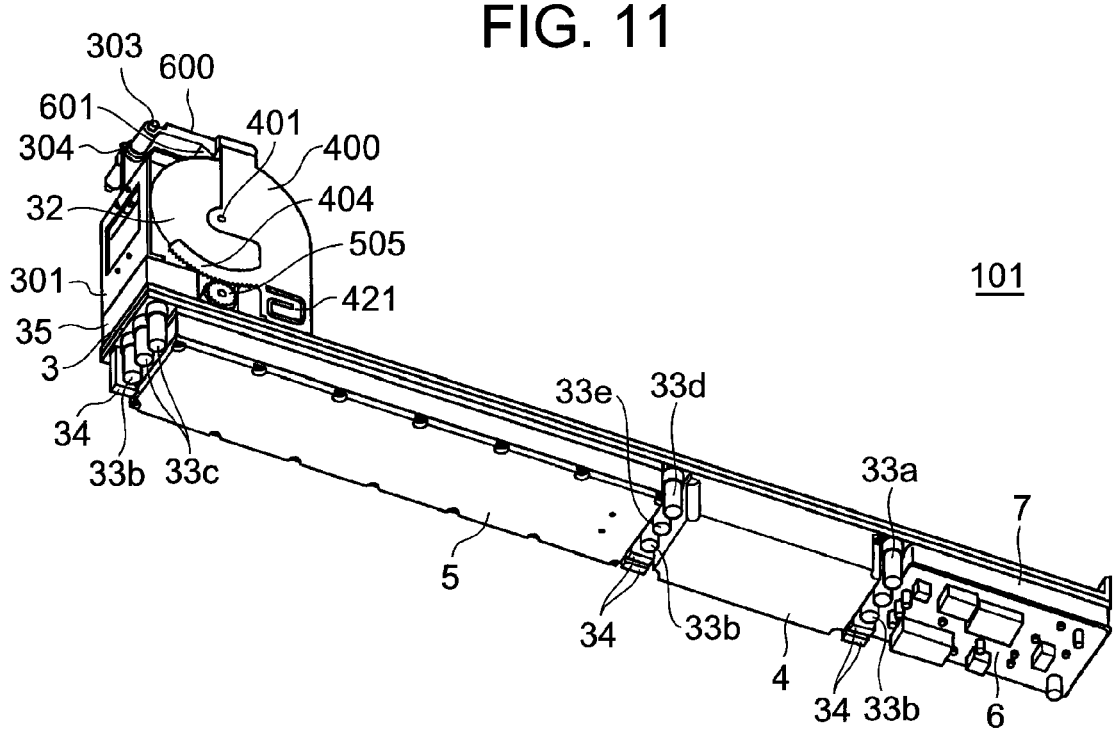
FIG. 11 is a perspective view showing the top surface, the front surface, and the left side surface of the fuel cell device main body 101.
Figure 12:
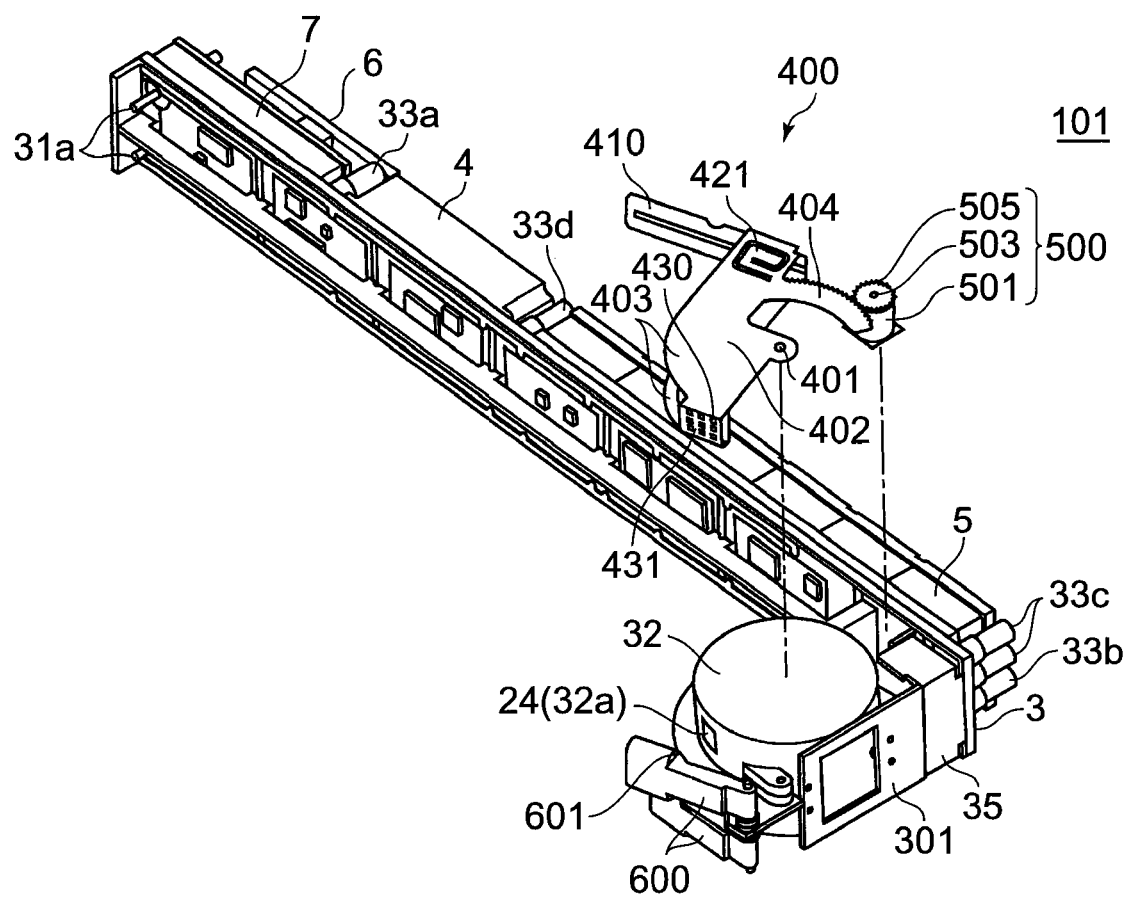
FIG. 12 is an exploded perspective view showing the top surface, the back surface, and the left side surface of the fuel cell device main body 101 in the state in which a cartridge conveying body 400 and an urging device 500 are removed.
Figure 13:
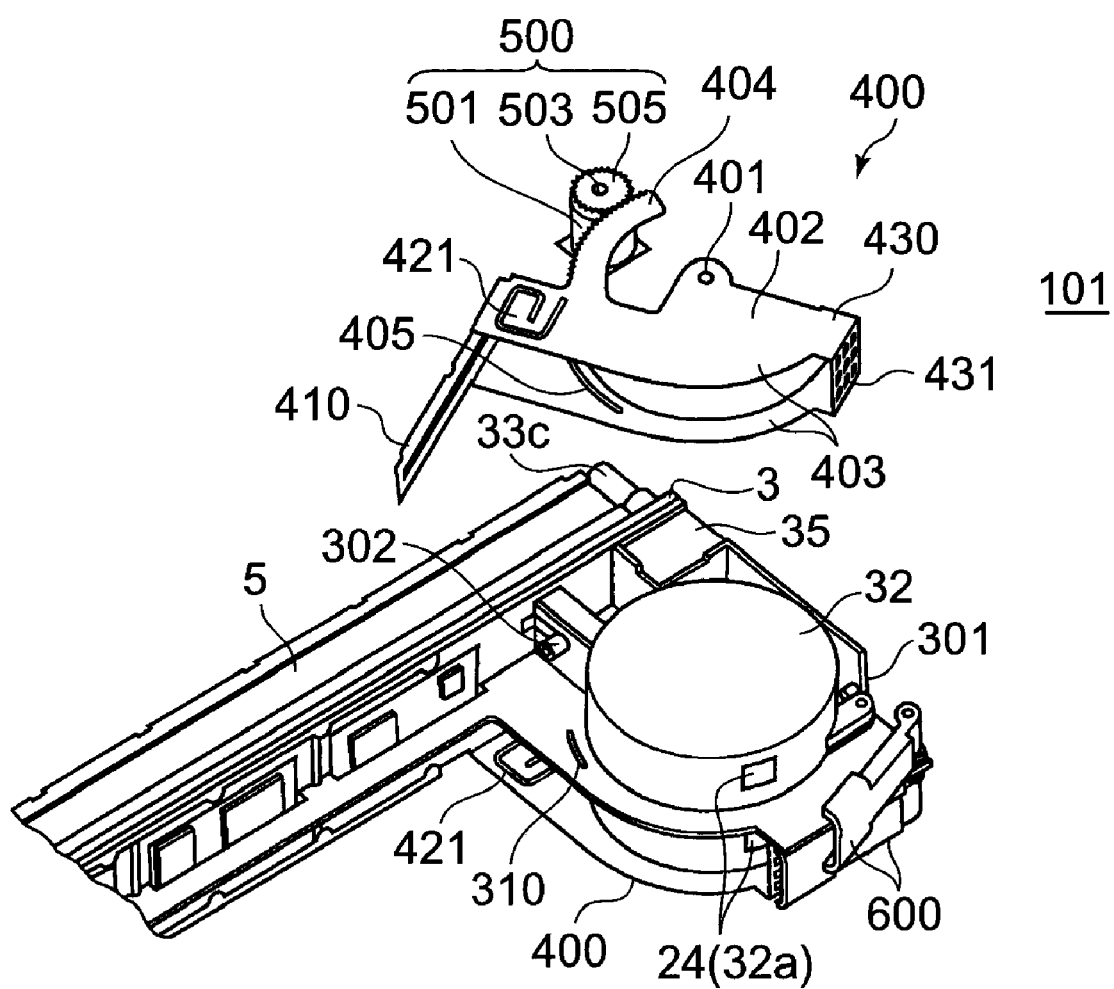
FIG. 13 is an exploded perspective view showing the top surface, the back surface, and the right side surface of the fuel cell device main body 101 in the state in which the cartridge conveying body 400 and the urging device 500 are removed.

FIGS. 7 and 8 are perspective views respectively showing the top surface, the back surface, and the left side surface of the fuel cell device 1 in the state in which the upper housing 102 and the lower housing 103 are taken away. Moreover, FIG. 9 is a perspective view showing the top surface, the back surface, and the left side surface of the fuel cell device main body 101 in the state in which the fuel cartridges 2 are removed from the fuel cell device 1; FIG. 10 is a perspective view showing the under surface, the back surface, and the right side surface of the fuel cell device main body 101; and FIG. 11 is a perspective view showing the top surface, the front surface, and the left side surface of the fuel cell device main body 101. Moreover, FIG. 12 is an exploded perspective view showing the top surface, the back surface, and the left side surface of the fuel cell device main body 101 in the state in which the cartridge conveying bodies 400 and the urging devices 500 are removed therefrom, and FIG. 13 is an exploded perspective view showing the top surface, the back surface, and the right side surface of the fuel cell device main body 101 in the state in which the cartridge conveying bodies 400 and the urging devices 500 are removed therefrom.

As shown in FIGS. 7 and 8, the flow path substrate 3 is arranged in the right-left direction of the fuel cell device 1, and various valves 33, the flow meters 34, the reaction device 4, the fuel cell 5, the DC/DC converter 6, the secondary battery 7, and the like, are provided on the front surface of the flow path substrate 3. The DC/DC converter 6 is connected to the electric power supplying terminal 110.

The pumps 31, the frame 301, the exhaust ports 302, and the like, are provided on the back surface of the flow path substrate 3. The water recovery equipment 35, the air pump 32, the urging devices 500, the fixing members 600, and the like, are fixed to the frame 301. Moreover, the cartridge conveying bodies 400 are arranged along the outer peripheral part of the air pump 32.

The pumps 31 are provided on the right end part of the flow path substrate 3, and are connected to the supply sections 22 of the fuel cartridges 2. The water recovery equipment 35 is provided in the left end part of the flow path substrate 3. Incidentally, the water recovery equipment 35 is connected to the exhaust ports 302 with the flow path substrate 3 put between them.

On the right side of the water recovery equipment 35, two urging devices 500 are respectively arranged on the upper and lower sides, and the air pump 32 is arranged on the rear part of the urging devices 500.

Each of the exhaust ports 302 is made of a rubber-like elastic body, and projects to the back direction from the right side of an urging device 500 of the flow path substrate 3, as shown in FIG. 13. The tip of the exhaust port 302 is bent to the right direction. The exhaust port 302 is connected to the connection hole 203 of a fuel cartridge 2.

The frame 301 fixes the water recovery equipment 35, the air pump 32, the urging devices 500, the fixing members 600, and the like, to the flow path substrate 3, and fixes the installation positions of the fuel cartridges 2. Moreover, circular arcuate projecting parts 310, which engages with groove portions 405 of the cartridge conveying bodies 400, are formed around the air pump 32 on the frame 301.

The air pump 32 is cylindrical, and is provided to pierce the frame 301 at the central part with the vertical direction being as the axial direction thereof as shown in FIGS. 12 and 13. The inlet ports 32a covered by the air filters 24 are formed on the outer peripheral part of the air pump 32.

The cartridge conveying bodies 400 are arranged above and below the frame 301 along the outer peripheral part of the air pump 32.

The fuel cartridges 2 are attached to the cartridge conveying bodies 400, which rotate the fuel cartridges 2 as shown in FIGS. 5 and 8.

The cartridge conveying bodies 400 each include the axial projection 401, a connecting section 402, cartridge holding sections 403, and a gear section 404.

The axial projections 401 engaging with the through-holes 104 and 105 of the upper housing 102 and the lower housing 103, respectively, are formed in the upper end part of the upper side cartridge conveying body 400 and in the lower end side of the lower side cartridge conveying body 400, respectively, and the cartridge conveying bodies 400 can rotate around the axial projections 401. Incidentally, the axial projections 401 are arranged on the central axis of the air pump 32, and the excursions of the cartridge conveying bodies 400 are the concentric circles of the outer peripheral surface of the air pump 32.

The connecting sections 402 connect the axial projections 401 with the cartridge holding sections 403, and rotate the cartridge holding sections 403 around the axial projections 401.

The cartridge holding sections 403 are each formed to be almost circular arcuate along the outer peripheral part of the air pump 32. Each of the cartridge holding sections 403 is provided with a guide plate 410 and the cartridge fixing section 420 at the front end thereof, and a seizing section 430 at the rear end thereof. The guide plates 410 come into contact with the front surfaces of the fuel cartridges 2 to guide the fuel cartridges 2 toward the cartridge holding sections 403.

Figure 14:
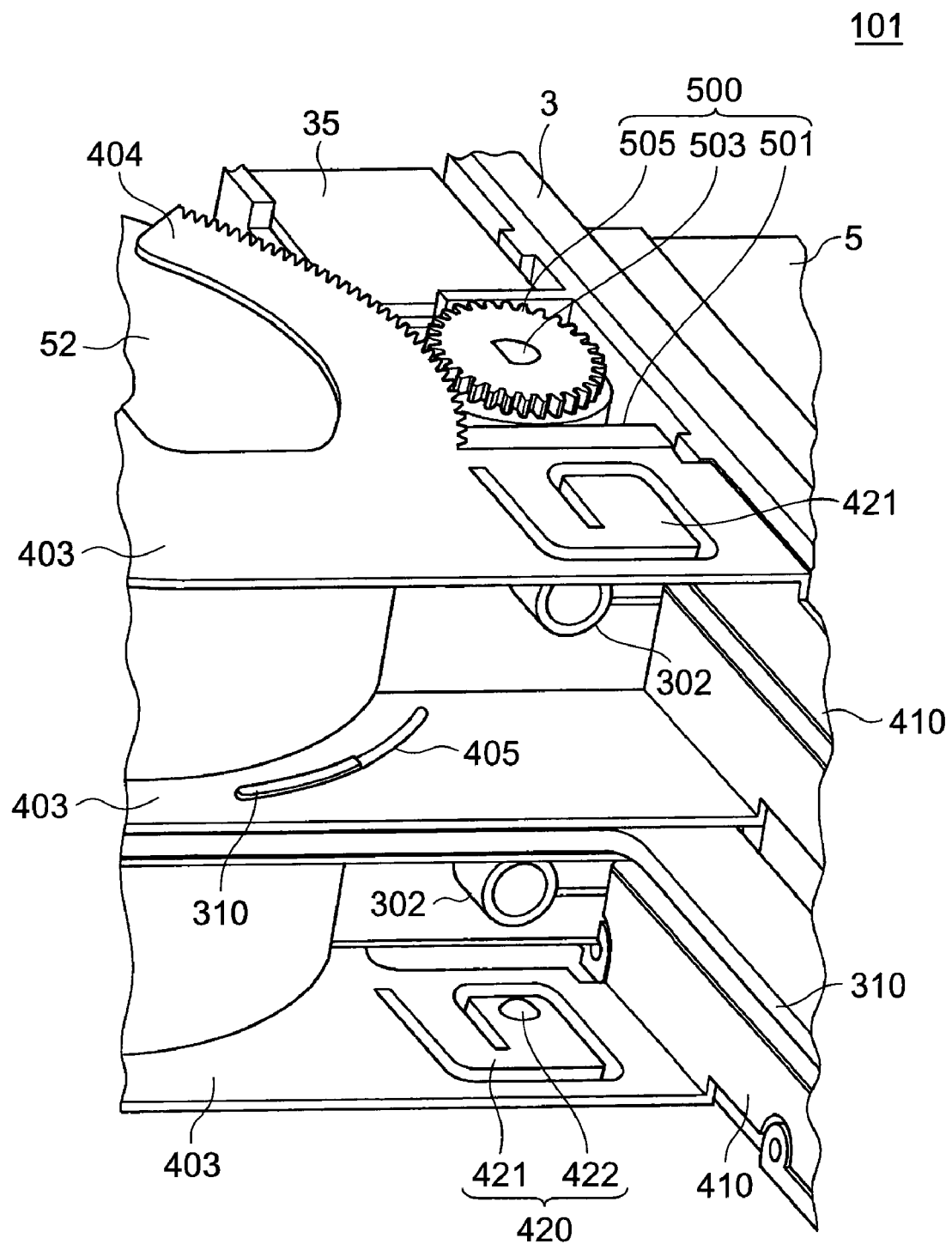
FIG. 14 is a perspective view showing an inside part at the front part of a cartridge holding section 403.

FIG. 14 is a perspective view showing the inside parts of the front parts of the cartridge holding sections 403. The cartridge fixing sections 420 are formed in the front parts of the cartridge holding sections 403 in the rears of the guide plates 410. Each of the cartridge fixing sections 420 includes a spiral plate spring 421 integrally formed with the cartridge conveying body 400, and the seizing projection 422 formed on the internal surface at the end of the plate spring 421. Because the seizing projection 422 is formed on the end of the plate spring 421, the seizing projection 422 can shake in the thickness direction of the cartridge holding section 403. The seizing projection 422 engages with either of the engaging concave portions 205A and 205B of a fuel cartridge 2 to fix the fuel cartridge 2.

Now, the procedure of fixing a fuel cartridge 2 to a cartridge fixing section 420 is described.

Figure 15:
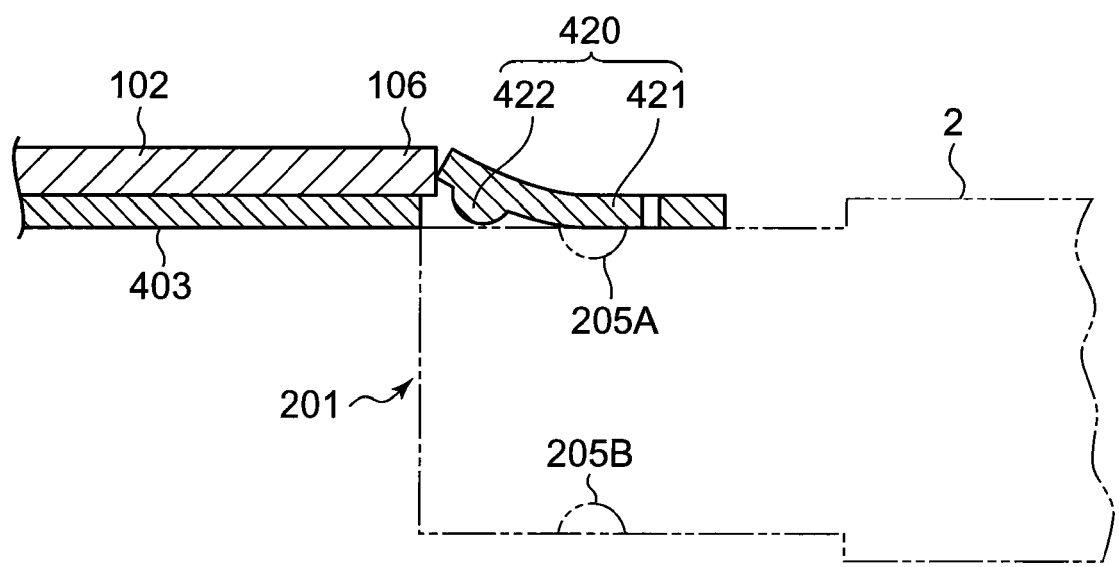
FIG. 15 is a schematic view showing the procedure of fixing the fuel cartridge 2 on a cartridge fixing section 420.

First, the fuel cartridge 2 is slid along the guide plate 410 toward the cartridge holding section 403. When the left end part of the fuel cartridge is inserted into the cartridge holding section 403, the detachably attaching section 201 of the fuel cartridge 2 comes into contact with the seizing projection 422, and the plate spring 421 is elastically deformed, so that the seizing projection 422 is pushed up as shown in FIG. 15.

Figure 16:
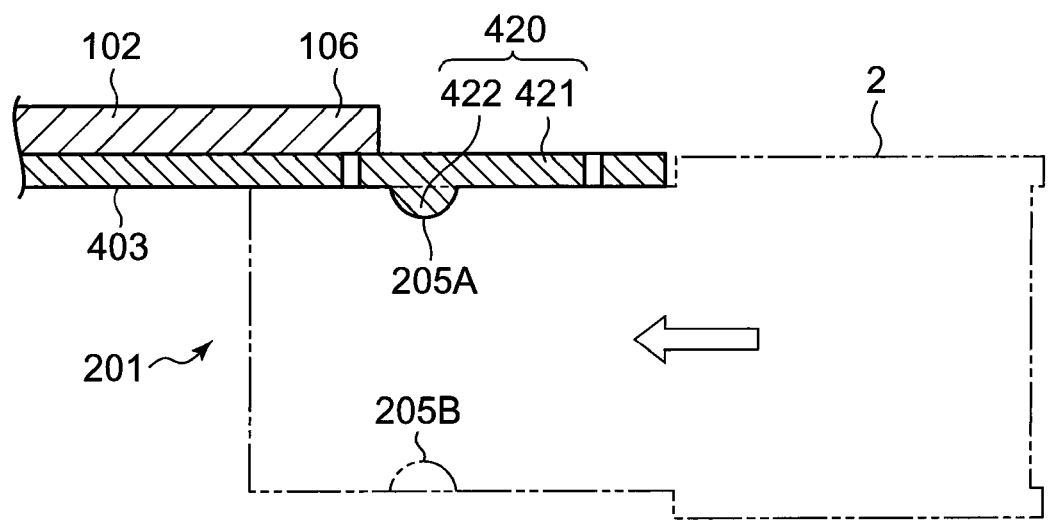
FIG. 16 is a schematic view showing the procedure of fixing the fuel cartridge 2 on the cartridge fixing section 420.

When the detachably attaching section 201 of the fuel cartridge 2 is further inserted to the inner part of the cartridge holding section 403, the engaging concave portion 205A is located at the position of the seizing projection 422 as shown in FIG. 16. Consequently, the seizing projection 422 is inserted into the engaging concave portion 205A by the restoring force of the plate spring 421. The detachably attaching section 201 of the fuel cartridge 2 is thereby fixed in the cartridge holding section 403.

In this manner, the fuel cartridge 2 is fixed to the cartridge fixing section 420.

Incidentally, a through-hole 431 is formed in the seizing section 430 at the position corresponding to the through-hole 206 lest the intake air flow path 23 should be covered in the state in which the fuel cartridge 2 is fixed to the cartridge fixing section 420.

The almost circular arcuate groove portion 405 is formed in a cartridge holding section 403 along the outer peripheral part of the air pump 32. The projecting part 310 of the frame 301 is inserted into the groove portion 405. The cartridge holding section 403 rotates along the outer peripheral part of the air pump 32 in the state in which the projecting part 310 is inserted into the groove portion 405.

The almost circular arcuate gear section 404 extends from the front side part of the cartridge holding section 403 to the left direction. The gear section 404 engages with a gear 505 of an urging device 500.

Figure 17:
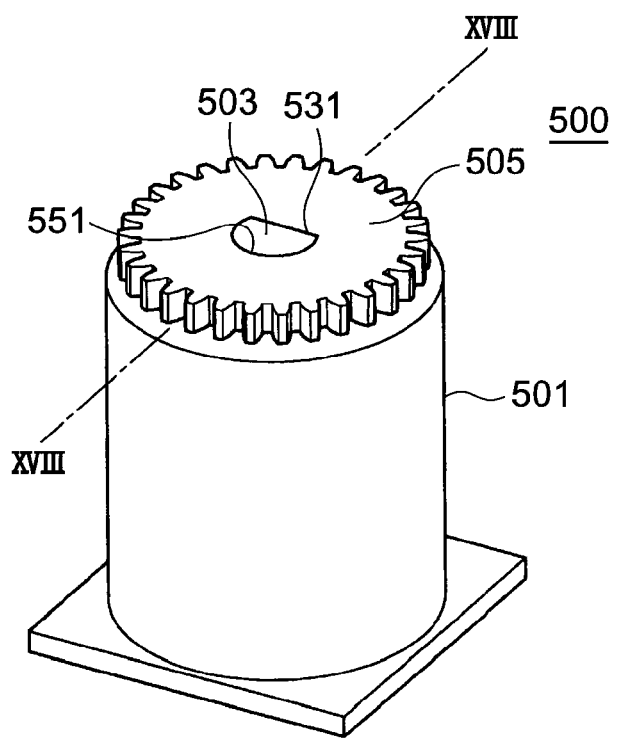
FIG. 17 is a perspective view showing the urging device 500.
Figure 18:
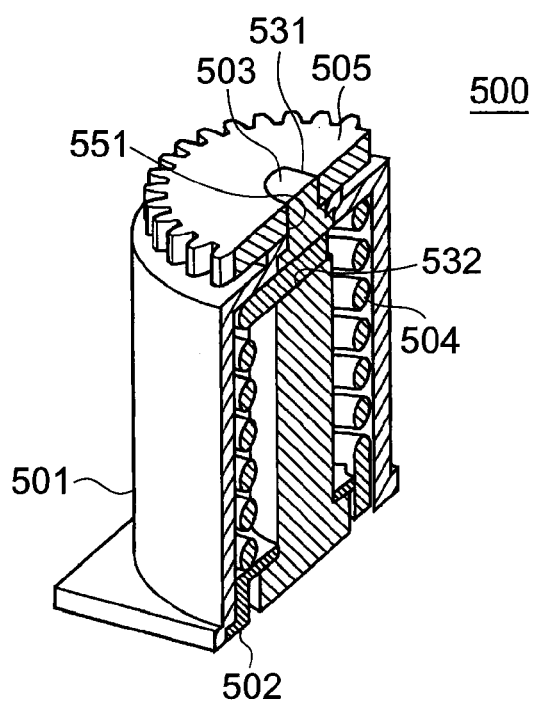
FIG. 18 is a partially cut-away perspective sectional view taken along a cutting plane line XVIII-XVIII in FIG. 17.

FIG. 17 is a perspective view showing each of the urging devices 500, and FIG. 18 is a partially cut-away perspective sectional view taken along a cutting plane line XVIII-XVIII in FIG. 17. As shown in FIGS. 17 and 18, the urging device 500 is composed of a housing 501, a fixing member 502, a rotation shaft 503, a coil spring 504, and the gear 505.

The housing 501 is shaped in a pipe with the opened lower end and the upper end formed as a bearing on the upper side of the rotation shaft 503. The coil spring 504, the rotation shaft 503, and the fixing member 502 are inserted into the housing 501. The housing 501 is fixed to the frame 301.

A notch 531 is formed on the upper end of the rotation shaft 503, and the rotation shaft 503 engages with the gear 505 with the upper end thereof inserted into the engaging hole 551 of the gear 505. Moreover, the rotation shaft 503 is inserted into the center of the toric fixing member 502, and also inserted into the center of the coil spring 504.

A through-hole 532 is formed perpendicularly with respect to the axial direction at the upper part of the rotation shaft 503, and one end of the coil spring 504 is inserted into the through-hole 532. The other end of the coil spring 504 is fixed to the fixing member 502. The diameter of the lower end of the rotation shaft 503 is enlarged to prevent the falling off of the fixing member 502 from the rotation shaft 503 by seizing the fixing member 502. The fixing member 502 is a bearing on the lower side of the rotation shaft 503. The fixing member 502 is fixed to the housing 501.

The gear 505 has the engaging hole 551 at the center thereof to engage with the upper end of the rotation shaft 503 which is projecting from the housing 501. When energy is accumulated in the coil spring 504, the rotation shaft 503 and the gear 505 are urged into either one of rotation directions by the restoring force of the coil spring 504.

Incidentally, an elastic body such as a main spring may be used in place of the coil spring 504.

When the guide plate 410 rotates a fuel cartridge and the cartridge conveying body 400 toward the direction approaching to the flow path substrate 3, the energy is accumulated in the coil spring 504. In this state, the cartridge conveying body 400 is urged by the coil spring 504 to the direction in which the guide plate 410 goes away from the flow path substrate 3.

A rotation shaft 303 having an axis in the vertical direction and a torsion spring 304 are provided in the left rear end part of the frame 301. The fixing members 600 are rotatably attached to the rotation shaft 303. Moreover, the torsion spring 304 urges the fixing members 600 to the front direction so that the fixing members 600 come into contact with the cartridge conveying bodies 400.

Figure 19:
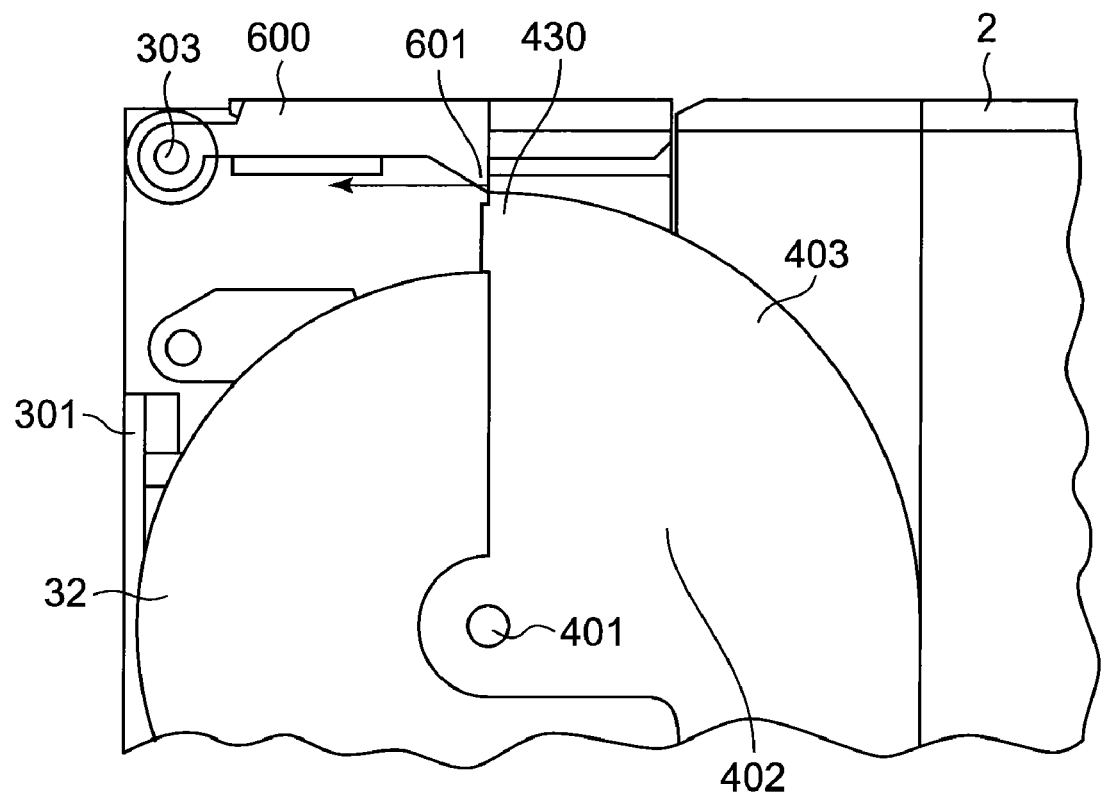
FIG. 19 is a plan view showing a positional relationship between a fixing member 600 and the cartridge conveying body 400 in the state in which the fuel cartridge 2 is attached to the fuel cell device main body 101.

FIG. 19 is a plan view showing the positional relationship between a fixing member 600 and a cartridge conveying body 400 in the state in which a fuel cartridge 2 is attached to the fuel cell device main body 101. As shown in FIG. 19, a seizing pawl 601 to seize the seizing section 430 of the cartridge conveying body 400 is provided on the front surface of the fixing member 600. In this state, the seizing section 430 of the cartridge conveying body 400 urged by an urging device 500 comes into contact with the seizing pawl 601, and the seizing pawl 601 seizes the cartridge conveying body 400 against the urging force of the urging device 500.

When the fixing member 600 is pulled to the rear against the urging force of the torsion spring 304, the seizing of the cartridge conveying body 400 by the seizing pawl 601 is released, and the cartridge conveying body 400 rotates in the left rotation direction in FIG. 19. On the other hand, when the cartridge conveying body 400 is rotated in the reverse direction, the cartridge conveying body 400 is seized by the seizing pawl 601 at the position where the guide plate 410 is arranged in parallel to the flow path substrate 3 because the fixing member 600 is urged to the front direction by the urging force of the torsion spring 304.

Incidentally, the distance between the rotation shaft 303 and the axial projection 401 is shorter than the length of the sum of the distance from the axial projection 401 to the seizing section 430 and the length of the fixing member 600, and the contacting part of the seizing pawl 601 and the seizing section 430 is situated in front of the rotation shaft 303. Consequently, the fixing member 600 is urged to the direction of rotating in the front direction (rightward rotation direction in FIG. 19) by the cartridge conveying body 400. Thus, the fixing member 600 is urged so as to come into contact with the seizing section 430, and does not inadvertently come off.

Moreover, because a gap is formed between the fixing member 600 and the through-hole 431, the fixing member 600 does not block the intake air flow path 23.

Next, the method of attaching and detaching a fuel cartridge 2 is described. First, as shown in FIG. 9, the seizing of the cartridge conveying body 400 by the fixing member 600 is made to be in the state of being released. Next, the fuel cartridge 2 is slid toward the cartridge holding section 403 along the guide plate 410, and the fuel cartridge 2 is fixed to the cartridge conveying body 400 as shown in FIG. 8. Next, as shown in FIG. 7, the fuel cartridge 2 is pushed into the front direction against the urging force of the urging device 500. Then, the fixing member 600 is rotated to the front direction by the urging force of the torsion spring 304 to seize the cartridge conveying body 400.

At this time, the supply section 22 and the pump 31 are connected with each other, and the exhaust port 302 and the connection hole 203 are connected with each other.

On the other hand, in order to remove the fuel cartridge 2 in the state of FIG. 7, the fixing member 600 is first pulled to the rear direction against the urging force of the torsion spring 304. Then, the seizing of the cartridge conveying body 400 by the seizing pawl 601 is released, and the fuel cartridge 2 and the cartridge conveying body 400 are pushed out to the rear direction as shown in FIG. 8. After that, by pulling out the fuel cartridge 2 along the guide plate 410, the fuel cartridge can be removed from the cartridge conveying body 400 as shown in FIG. 9.

Incidentally, when the installation of the fuel cartridge 2 to the cartridge conveying body 400 is imperfect, as shown in FIG. 15, the seizing projection 422 does not engage with the engaging concave portion 205A, and the plate spring 421 becomes the state in which the plate spring 421 projects to the outside. When the cartridge conveying body 400 is tried to be rotated to the front direction, the plate spring 421 collides with the rotation preventing section 106 of the upper housing 102. Consequently, the rotation of the cartridge conveying body 400 is prevented, and the rotation of the cartridge conveying body 400 is stopped at the position shown in FIG. 5.

Consequently, it can be prevented that the fuel cartridge 2 rotates in the state of being imperfectly installed in the cartridge conveying body 400, and that the supply section 22 and the pump 31 collide with each other. Moreover, by the impossibility of the connection of the fuel cartridge 2 with the fuel cell device main body 101, an operator can become aware of bad connection and can easily confirm the bad connection by visual observation or a tactile sensation.

As described above, according to the present embodiment, by installing the fuel cartridge 2 to the cartridge conveying body 400 to push in the fuel cartridge 2, the fuel cartridge 2 can be easily installed in the electronic equipment 1000. Moreover, because the fuel cartridge 2 is pushed out to the rear direction only by pulling the fixing member 600 to the rear direction, the fuel cartridge 2 can easily be removed.

Moreover, the circular arcuate concave portion 202 is formed in the left end part of the fuel cartridge 2, and the concave portion 202 is arranged to come into contact with the outer peripheral surface of the cylindrical air pump 32. Then, the fuel cartridge 2 can easily be rotated by sliding the fuel cartridge 2 along the outer peripheral surface of the air pump 32 in association with the rotation of the cartridge conveying body 400.

Moreover, because the fuel cartridge 2 is provided with the supply section 22 at the end on the opposite side to the detachably attaching section 201 to be attached and detached to the cartridge conveying body 400, the curvature radius of the excursion of the supply section 22 becomes large, and consequently the liquid intake section 31a can more easily be inserted into the supply section 22.

Moreover, because the fuel cartridges 2 are arranged above and below, the fixing members 600 can also be arranged above and below closely, and have an advantage of easily performing the operation of attaching and detaching.

On the other hand, because the fuel cartridges 2 are removed by pulling the fixing members 600 to the rear directions, the fuel cartridges 2 do not come off even when the fuel cartridges 2 inadvertently collide.

Moreover, the supply sections 22 through which mixed liquids are ejected from the fuel cartridges 2 are on their front surfaces, and the through-holes 206 which is to be the intake air flow paths 23 and the connection holes 203 which is to be the exhaust air flow paths 25 are formed on the left side surfaces of the fuel cartridges 2. Consequently, connection errors do not occur.

Incidentally, although the notebook-sized personal computer has been described in the above embodiment, the present invention is not to this one, but may be applied to the portable electronic equipment such as a PDA, an electronic personal organizer, a digital camera, a cellar phone, a wrist watch, game equipment, and the like.

Moreover, the cartridge conveying bodies 400 may be rotated by using a stepping motor or the like in place of the urging devices 500.

The entire disclosure of Japanese Patent Application No. 2007-170534 filed on Jun. 28, 2007 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A fuel cell device comprising:
a fuel cartridge to accumulate a fuel therein; and
a fuel cell device main body to generate electric power by using the fuel accumulated in the fuel cartridge,
wherein the fuel cell device main body is provided with a cartridge conveying body, the fuel cartridge being attachable to and detachable from the cartridge conveying body,
wherein the cartridge conveying body is provided so as to be rotatable with respect to the fuel cell device main body,
wherein a cylindrical member is coaxially disposed with a rotation center of the cartridge conveying body, and
wherein the fuel cartridge is formed with a concave portion which contacts an outer peripheral surface of the cylindrical member.

2. The fuel cell device according to claim 1, wherein the fuel cartridge is detachably attachable to the cartridge conveying body by moving the fuel cartridge in an opposite direction of the cartridge conveying body.

3. The fuel cell device according to claim 1, wherein the cartridge conveying body comprises a cartridge holding section into which the fuel cartridge is inserted,
wherein an engaging concave portion is provided on an outer surface of the fuel cartridge at a portion where the fuel cartridge is inserted into the cartridge holding section, and
wherein the cartridge holding section comprises a cartridge fixing section at an inner surface, which is provided with a seizing projection to engage with the engaging concave portion so as to fix the fuel cartridge onto the cartridge fixing section.

4. The fuel cell device according to claim 3, wherein the cartridge fixing section is made of an elastic material.

5. The fuel cell device according to claim 3, wherein the cartridge fixing section projects outwardly when the seizing projection is in contact with the outer surface of the fuel cartridge other than the engaging concave portion, and
wherein the fuel cell device main body comprises a rotation preventing section to prevent rotation of the cartridge conveying body, and the rotation preventing section contacts the cartridge fixing section when the cartridge fixing section projects outwardly.

6. The fuel cell device according to claim 1, further comprising an urging device to urge the cartridge conveying body to rotate the fuel cartridge away from the fuel cell device main body.

7. The fuel cell device according to claim 6, wherein the urging device comprises:
a housing to be fixed to the fuel cell device main body;
a gear provided so as to be rotatable with respect to the housing; and
an elastic body having one end which is fixed to the housing and another end which is fixed to a rotation shaft of the gear,
wherein the urging device urges the cartridge conveying body by engaging the gear with the cartridge conveying body.

8. The fuel cell device according to claim 6, further comprising a fixing member provided so as to be rotatable with respect to the fuel cell device main body,
wherein the fixing member has a seizing pawl to seize the cartridge conveying body which is urged by the urging device.

9. An electronic equipment comprising:
the fuel cell device according to claim 1; and
an electronic equipment main body to which the electric power is supplied from the fuel cell device.

10. The fuel cell device according to claim 1, wherein the concave portion has an arc-like surface.

11. The fuel cell device according to claim 1, wherein the fuel cartridge comprises a supply section to supply the fuel accumulated in the fuel cartridge, the supply section being provided at an end portion of the fuel cartridge on a side opposite to a side where the fuel cartridge is detachably attachable to the cartridge conveying body, and the supply section being connectable to the fuel cell device main body.

* * * * *